US010124453B2

(12) United States Patent
Wong et al.

(10) Patent No.: US 10,124,453 B2
(45) Date of Patent: Nov. 13, 2018

(54) HEADSTOCK STRUCTURE OF COMPUTER NUMERICAL CONTROL MILLING AND BORING MACHINE TOOL

(71) Applicants: Tsung-Hua Wong, New Taipei (TW); Gui Ya, Hubei (CN); Wei Li, Hubei (CN)

(72) Inventors: Tsung-Hua Wong, New Taipei (TW); Gui Ya, Hubei (CN); Wei Li, Hubei (CN)

(*) Notice: Subject to any disclaimer, the term of this patent is extended or adjusted under 35 U.S.C. 154(b) by 74 days.

(21) Appl. No.: 15/352,493

(22) Filed: Nov. 15, 2016

(65) Prior Publication Data
US 2018/0133854 A1    May 17, 2018

(51) Int. Cl.
| B23B 47/00 | (2006.01) |
| B23Q 1/46 | (2006.01) |
| B23B 39/02 | (2006.01) |
| B23Q 5/40 | (2006.01) |
| B23Q 11/00 | (2006.01) |

(52) U.S. Cl.
CPC ............... *B23Q 1/46* (2013.01); *B23B 39/02* (2013.01); *B23Q 5/40* (2013.01); *B23Q 11/001* (2013.01); *B23B 2250/04* (2013.01); *B23B 2260/088* (2013.01); *B23Q 11/0035* (2013.01); *Y10T 408/8598* (2015.01)

(58) Field of Classification Search
CPC ....... B23Q 1/46; B23Q 11/0035; B23B 39/02; B23B 2250/04; B23B 2260/088; B23B 29/03407; Y10T 408/8598; Y10T 408/858
See application file for complete search history.

(56) References Cited

U.S. PATENT DOCUMENTS

| 3,180,187 | A | * | 4/1965 | McFerren | ......... B23B 29/03439 82/131 |
| 4,599,769 | A | * | 7/1986 | Latzko | ............... B23B 29/03439 29/26 A |
| 4,899,628 | A | * | 2/1990 | Seichter | ............ B23B 29/03467 82/1.4 |
| 5,154,554 | A | * | 10/1992 | Ariyoshi | ............ B23Q 11/0035 408/143 |

* cited by examiner

*Primary Examiner* — Daniel Howell
*Assistant Examiner* — Paul M Janeski (57) ABSTRACT

A headstock structure of computer numerical control milling and boring machine tool comprising a spindle, a conducting slip ring, a rotating plate, a mobile unit, two balancing units, a driving unit, and a cutter locking unit; the conducting slip ring being sleeved on a top end of the spindle; the rotating plate being rotated in horizontal direction under the drive of the spindle; the mobile being rotated in horizontal direction together with the rotating plate; the two balancing units being located on the rotating plate; the driving unit being configured to drive the mobile unit to perform horizontal radial movement; the cutter locking unit being configured to lock the cutter, so that the headstock structure can rotate and move up and down, and can perform horizontal radial motion.

8 Claims, 9 Drawing Sheets

Fig. 9

HEADSTOCK STRUCTURE OF COMPUTER NUMERICAL CONTROL MILLING AND BORING MACHINE TOOL

TECHNICAL FIELD

The present invention relates to a headstock structure of computer numerical control milling and boring machine tool.

BACKGROUND OF THE INVENTION

With instant development of economy, every industry or trade uses mechanized and automated operating equipment universally, and the requirement for the working accuracy of various machines is stricter. In order to satisfy the accuracy requirement in production manufacturing, the computer numerical machine tool is used on the existing technology.

According to market diagnosis, many industries need a high precision milling boring machine tool which can implement multi-task machining of facing, surface, bore, inner cone, outer circle, outer cone, cylindrical thread, taper thread and so on at a time.

However, the present high precision computer numerical control milling and boring machine tool is expensive, adverse to popularization. Therefore, most suppliers use computer numerical control milling and boring machine tool at a lower price and its machine tool headstock can move in only one direction. But the computer numerical control milling and boring machine tool has low automaticity, high mismachining tolerance and low precision, and when the workpiece shall be machined in multiple directions, the change of placement is slow, taking time and labor, the functioning efficiency is low. Therefore, if the machine tool headstock can shift multiple directions, the practicability can be enhanced greatly, and the time and cost can be saved.

In view of this, how to provide a headstock structure of computer numerical control milling and boring machine tool which can rotate and move up and down, and can perform horizontal radial motion is the topic to be improved by the present invention.

DESCRIPTION OF THE INVENTION

The objection of the present invention is to overcome the deficiency of the current technology by providing a headstock structure of computer numerical control milling and boring machine tool.

In order to solve the above-mentioned problems and achieve the objective of the present invention, the technical scheme is to provide a 1.

A headstock structure of computer numerical control milling and boring machine tool comprising: the headstock structure (100) comprising a spindle (1), a conducting slip ring (2), a rotating plate (3), a mobile unit (4), two balancing units (5), a driving unit (6), and a cutter locking unit (7); the conducting slip ring (2) being sleeved on a top end of the spindle (1); the rotating plate (3) being disposed below a lower end of the spindle (1) and can be rotated in horizontal direction under the drive of the spindle (1); the mobile unit (4) being disposed below the rotating plate and can be rotated in horizontal direction together with the rotating plate (3); the two balancing units (5) being located on the rotating plate (3), and on two opposite sides of the spindle (1) respectively; the driving unit (6) being located on one side of the rotating plate (3) and the mobile unit (4), and configured to drive the mobile unit (4) to perform horizontal radial movement; the cutter locking unit (7) being located under the mobile unit (4) and configured to lock the cutter.

More particularly, wherein the mobile unit (4) comprises two symmetrically spaced mobile linear guideways (41) connected to the rotating plate (3) and a mobile plate (42) located under the two mobile linear guideways (41) which can be shifted at the two mobile linear guideways (41).

More particularly, wherein the balancing unit (5) comprises a balancing linear guideway (51) corresponding to the mobile linear guideway (41) and a balancing weight (52) located on the balancing linear guideway (51) which can be shifted on the balancing linear guideway (51).

More particularly, wherein the driving unit (6) comprises a servo motor (61) with a shaft (611) located on the rotating plate (3) and electrically connected to the conducting slip ring (2); a first belt pulley (62) connected to the shaft (611) for the servo motor (61) to drive; a driving screw set (63) located under the rotating plate (3); a second belt pulley (64) connected to the driving screw set (63); and a belt (65) located between the first belt pulley (62) and the second belt pulley (64) for the first belt pulley (62) to drive the second belt pulley (64).

More particularly, wherein the driving screw set (63) comprises a driving screw (631); two fixed blocks (632) located on both ends of the driving screw (631) and connected to the rotating plate (3); and a mobile base (633) located at the driving screw (631) and connected to the mobile plate (42) for the driving screw (631) to drive the mobile plate (42).

More particularly, wherein the spindle comprises a slot (11) disposed at one side of the lower end thereof for holding the servo motor (61); the slot (11) comprises at least one fixing component (12) disposed outside thereof for fixing the servo motor (6), and the fixing component (12) has a punch hole (121) corresponding to the shaft (611); the rotating plate (3) comprises a gap (32) disposed at one side thereof for keeping the rotating plate (3) balanced during rotation, the gap (32) being located between the first belt pulley (62) and the second belt pulley (64) for the belt (65) to go through.

More particularly, wherein the rotating plate (3) comprises a gear set (31) respectively disposed on two opposite sides thereof; the mobile unit (4) located on both sides of the mobile plate (42) respectively includes first tooth rows (43) corresponding to a side edge of the gear sets (31); the balancing unit (5) located under the two balancing weights (52) respectively includes second tooth rows (53) corresponding to the opposite side edge of the gear sets (31) for the two balancing weights (52) to move together with the mobile plate (42).

More particularly, wherein the gear set (31) comprises a plurality of follower gears (311) for connecting the first tooth row (43) to the second tooth row (53) and a plurality of driven gears (312) disposed between the two follower gears (311).

More particularly, wherein the mobile unit (4) comprises an optical scale (44) disposed at one side of the mobile plate (42) and paralleled with the mobile linear guideway (41), and electrically connected to a master control circuit of machine tool.

Compared with the existing technology, the functions and effects of the present invention are described below:

1: the same as the existing computer numerical control milling and boring machine tool, the present invention allows the overall headstock structure (100) to move up and down, and to rotate under the drive of spindle (1), the mobile unit (4) can perform horizontal radial movement by means of driving unit (6), and the cutter locking unit (7) is applicable to different cutters, so that the computer numerical control milling and boring machine tool can implement turning, milling, boring and drilling according to the cutter type, so as to operate different working procedures for the workplace to save the expenses of purchasing other equipment. Therefore, it has simple structure and convenient installation, and increases the overall operating efficiency, the production cost is lower.

2: in the present invention, a gear set (31) is mounted on both sides of rotating plate (3). The first tooth row (43) is mounted on both sides of mobile plate (42). The second tooth row (53) is mounted under two balancing weights (52) respectively. The gear set (31), the first tooth row (43) and the second tooth row (53) engage with each other, so that when the mobile unit (4) performs horizontal radial movement by means of driving unit (6), the first tooth row (43) can drive the gear set (31) to rotate, and drive the second tooth row (53) indirectly for moving the balancing weight (52) on balancing linear guideway (51), so as to reduce the centrifugal force in the rotation of rotating plate (3) and mobile unit (4), and to make the equipment operation safer.

DETAILED DESCRIPTION OF THE INVENTION

Detailed descriptions are provided below based on the embodiment depicted in the accompanying draws.

Figure 1:
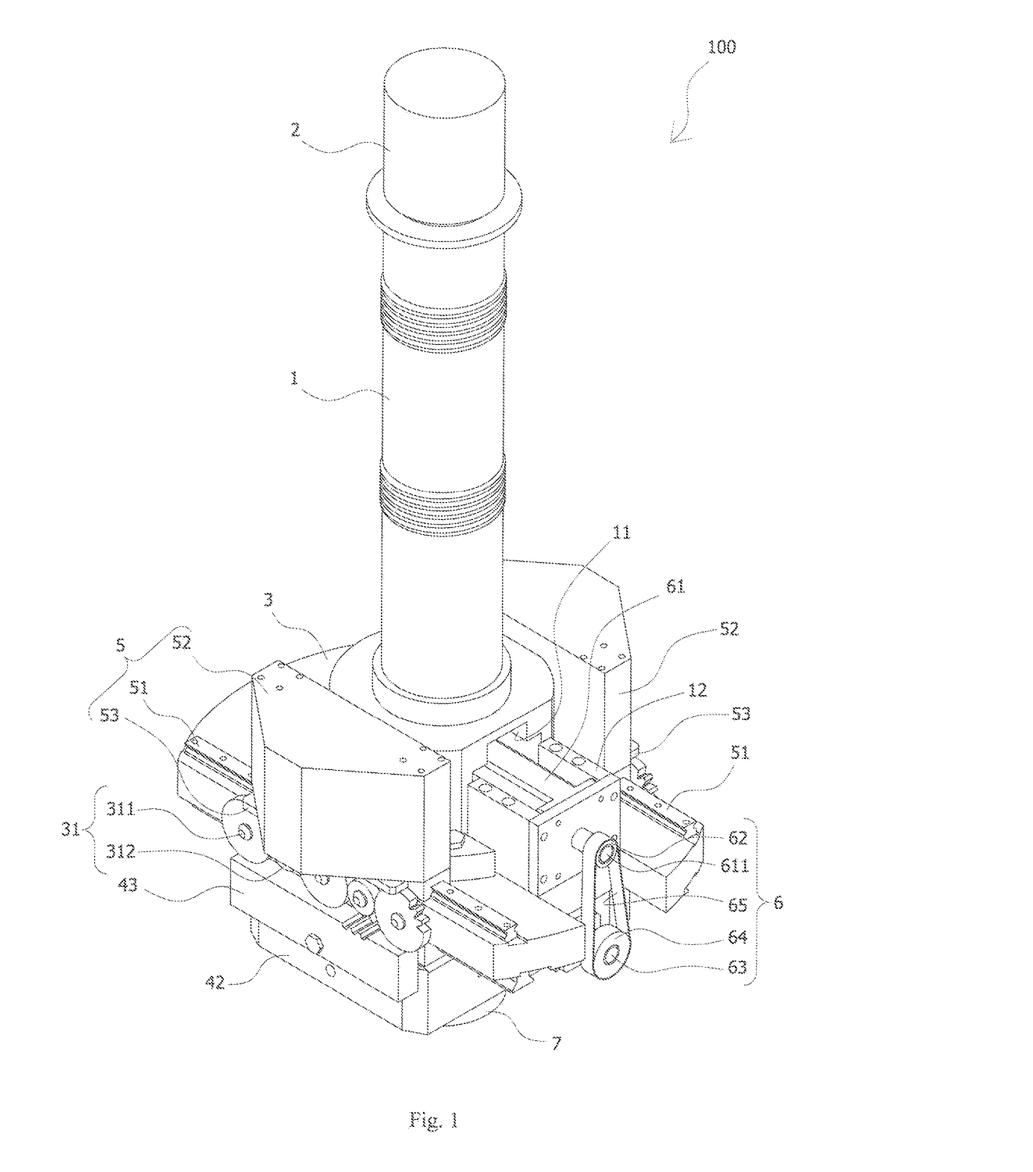
FIG. 1 is a perspective view of a headstock structure of computer numerical control milling and boring machine tool of the present invention.
Figure 2:
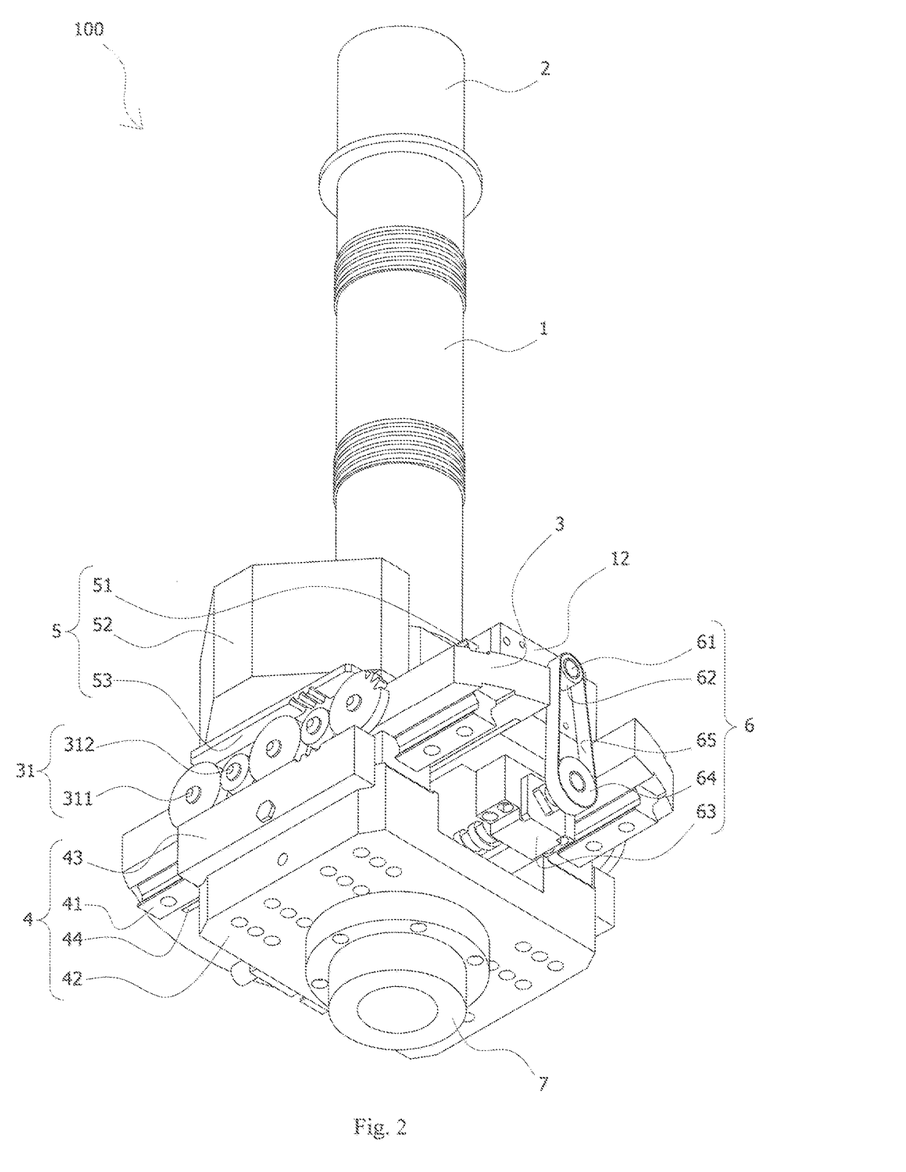
FIG. 2 is another angle of the structural schematic view of the present invention.
Figure 3:
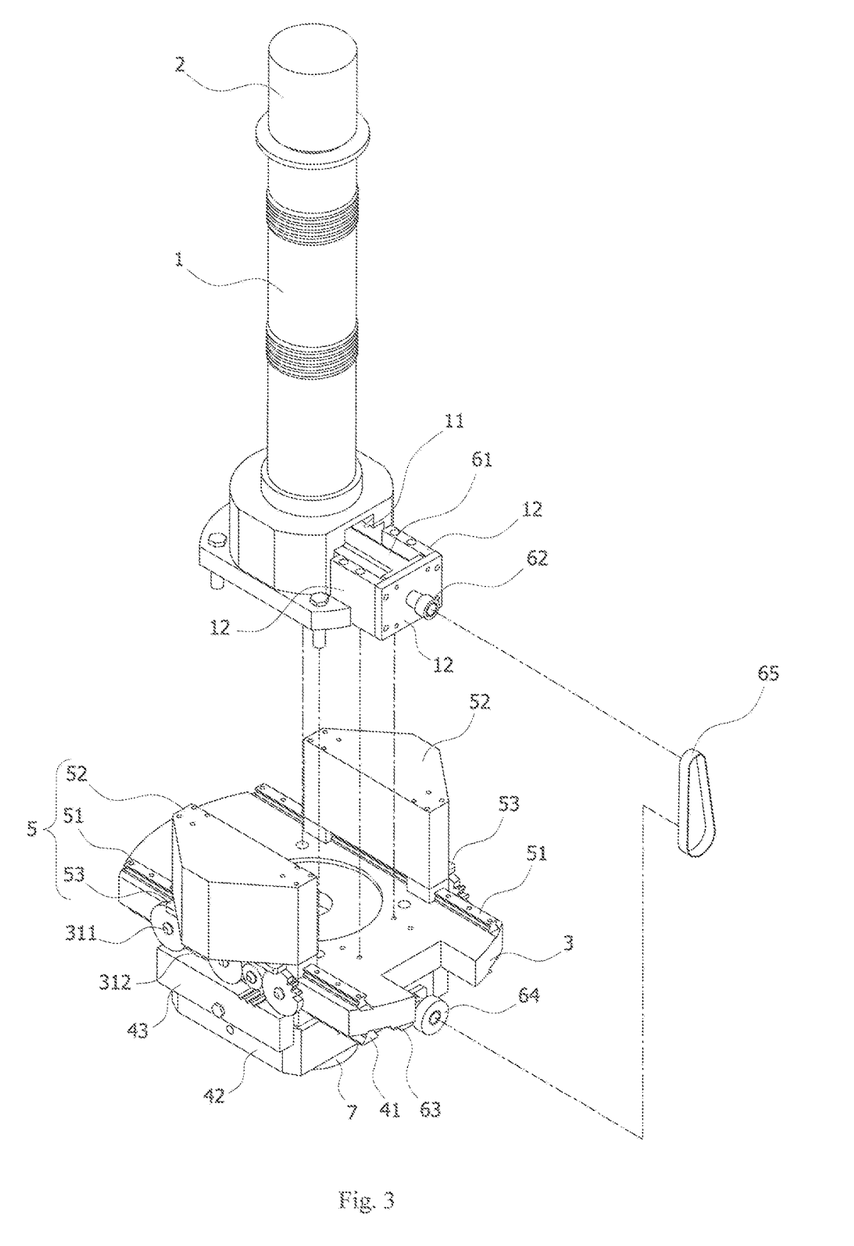
FIGS. 3-6 are exploded views of various components of the present invention.

A headstock structure of computer numerical control milling and boring machine tool as illustrated in FIGS. 1-3, the headstock structure (100) comprises a spindle (1), a conducting slip ring (2), a rotating plate (3), a mobile unit (4), two balancing units (5), a driving unit (6), and a cutter locking unit (7). The conducting slip ring (2) is sleeved on a top end of the spindle (1); the rotating plate (3) is disposed below a lower end of the spindle (1) and can be rotated in horizontal direction under the drive of the spindle (1); the mobile unit (4) is disposed below the rotating plate and can be rotated in horizontal direction together with the rotating plate (3); the two balancing units (5) are located on the rotating plate (3), and on two opposite sides of the spindle (1) respectively; the driving unit (6) is located on one side of the rotating plate (3) and the mobile unit (4), and configured to drive the mobile unit (4) to perform horizontal radial movement; the cutter locking unit (7) is located under the mobile unit (4) and configured to lock the cutter, such as milling cutter, boring cutter, drilling tool and so on.

Figure 7:
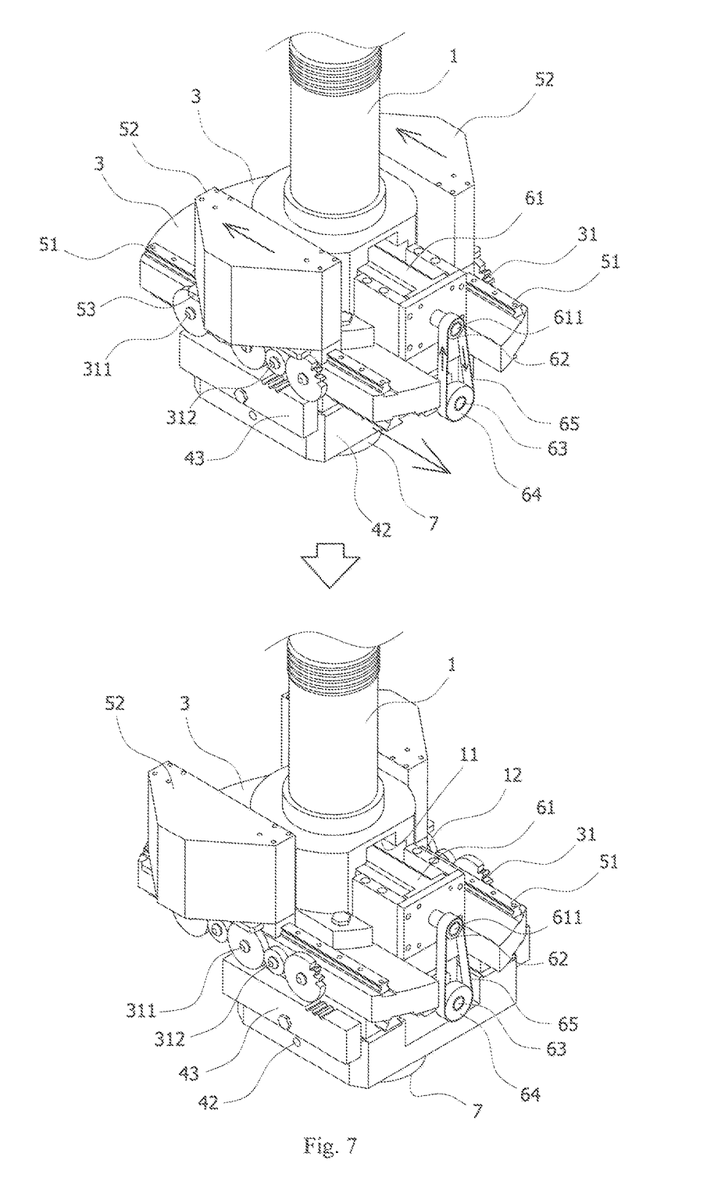
FIG. 7 is a schematic view showing the headstock structure performing horizontal radial movement.

The headstock structure (100) is used in computer numerical control (CNC) milling and boring machine. The overall headstock structure (100) is applicable to upward/downward movement. According to FIG. 3, the mobile unit (4) is connected to rotating plate (3), and the rotating plate (3) is connected to spindle (1). When the conducting slip ring (2) supplies power to the spindle (1), under the drive of spindle (1), the mobile unit (4) and rotating plate (3) rotate in horizontal direction together with the spindle (1). Said functions are identical with the existing CNC milling and boring machine, the characteristic is that the mobile unit (4) can perform horizontal radial motion shown in FIG. 7 under the effect of the driving unit (6), so that the overall headstock structure (100) can process the workpiece in three directions. If the cutter can rotate at a tilt angle, it is more effective on multidirectional machining, so as to save the time for changing the workpiece placement to increase the operating efficiency.

The mobile unit (4) comprises two symmetrically spaced mobile linear guideways (41) connected to the rotating plate (3) and a mobile plate (42) located under the two mobile linear guideways (41) which can be shifted at the two mobile linear guideways (41).

Figure 5:
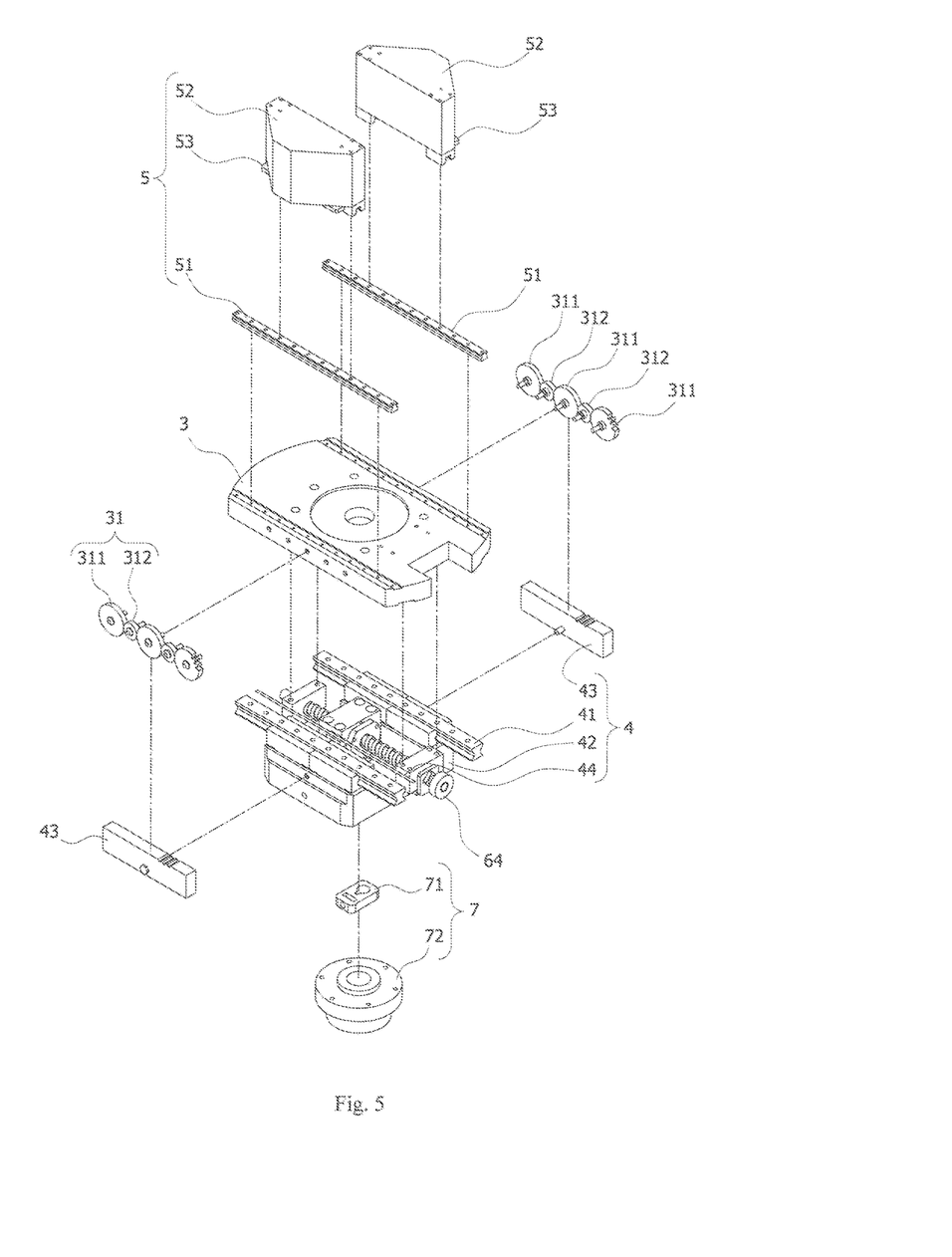

Please see FIG. 5, in said mobile unit (4), the mobile linear guideway (41) is fixed under the rotating plate (3), so that the mobile plate (42) can perform radial movement at mobile linear guideway (41), and the cutter locking unit (7) with a cutter can turn a plane. The rotating plate (3) rotates under the drive of spindle (1), so the mobile plate (42) rotates 360° in horizontal direction with rotating plate (3).

The balancing unit (5) comprises a balancing linear guideway (51) corresponding to the mobile linear guideway (41) and a balancing weight (52) located on the balancing linear guideway (51) which can be shifted on the balancing linear guideway (51).

As the mobile plate (42) is a driven component, it is likely to generate centrifugal force during rotation, and likely to disengage during rotation. Therefore, as shown in FIG. 5, the balancing units (5) composed of the balancing linear guideways (51) and the balancing weights (52) are located on both sides of spindle (1) symmetrically, so that the balancing weight (52) can perform radial movement on balancing linear guideway (51), to control the mobile plate (42) when the rotating plate (3) is rotating, the rotating plate (3) is kept balanced.

Figure 4:
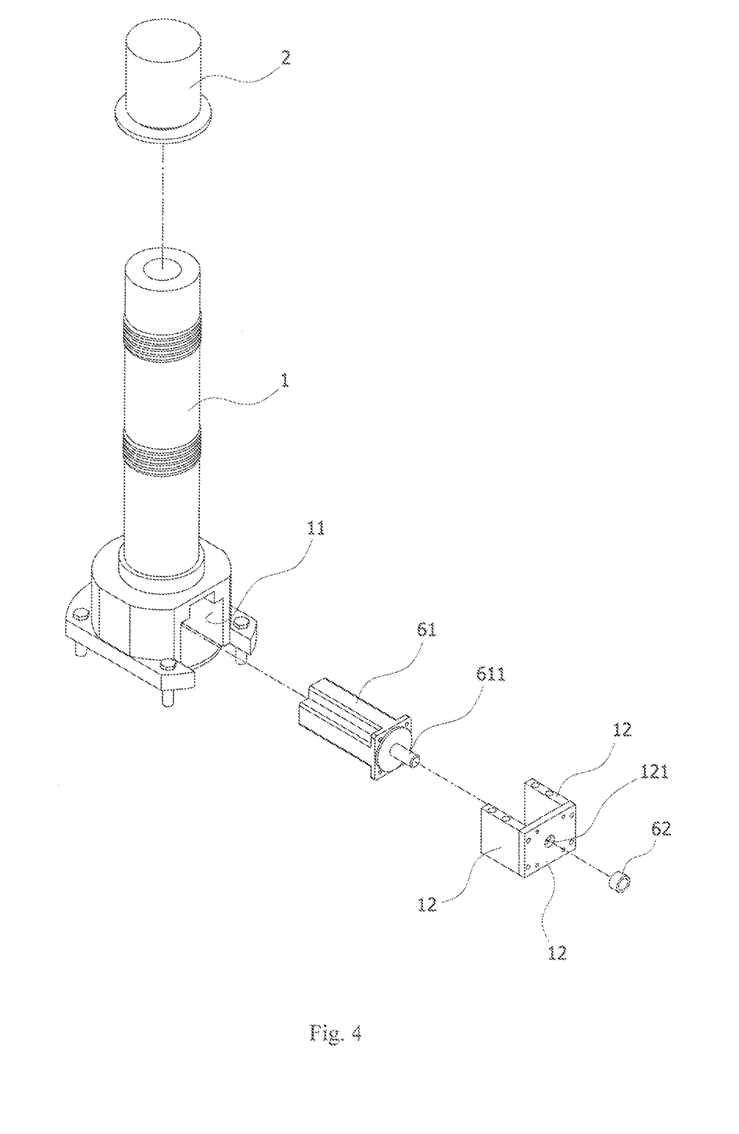

The driving unit (6) is shown in FIGS. 2 and 4, including a servo motor (61) with a shaft (611) located on the rotating plate (3) and electrically connected to the conducting slip ring (2); a first belt pulley (62) connected to the shaft (611) for the servo motor (61) to drive; a driving screw set (63) located under the rotating plate (3); a second belt pulley (64) connected to the driving screw set (63); and a belt (65) located between the first belt pulley (62) and the second belt pulley (64) for the first belt pulley (62) to drive the second belt pulley (64).

Figure 6:
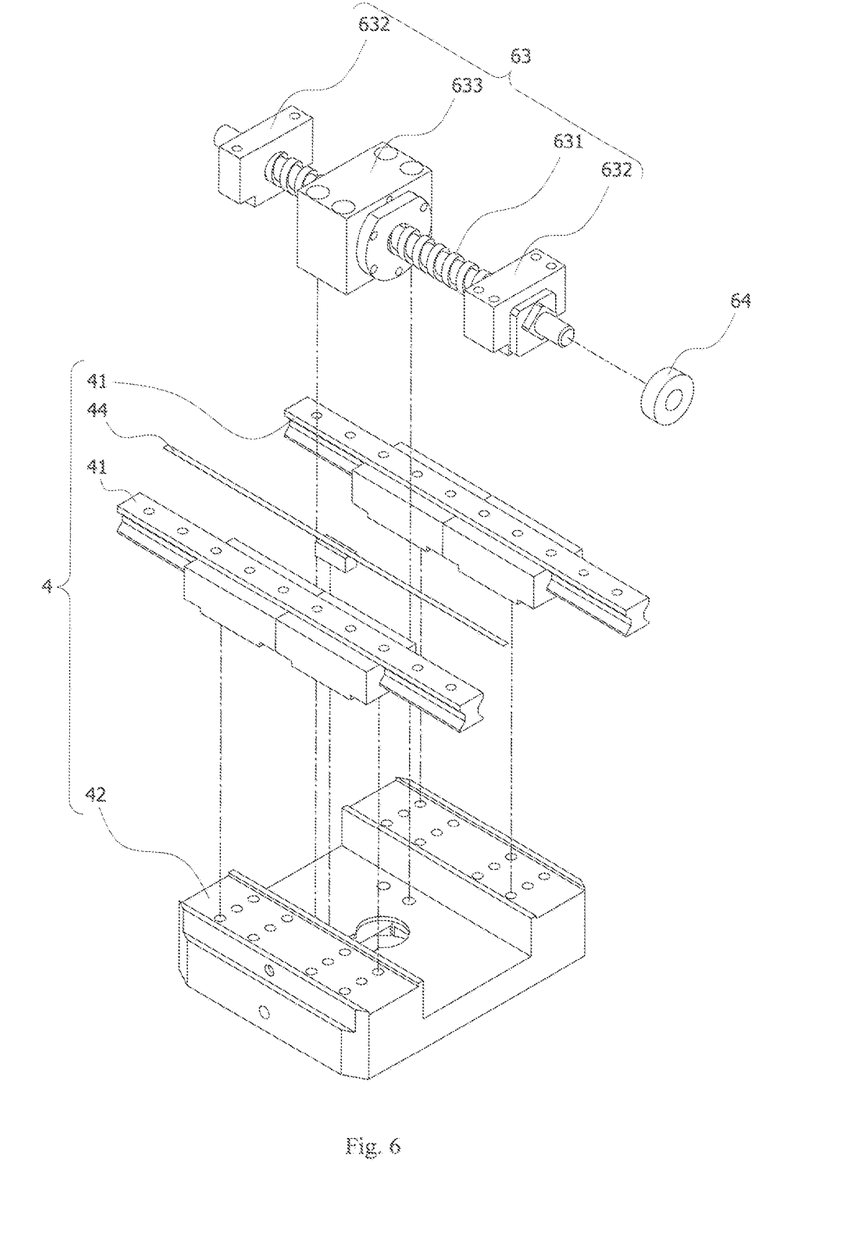

Please see FIG. 6, said driving screw set (63) comprises a driving screw (631); two fixed blocks (632) located on both ends of the driving screw (631) and connected to the rotating plate (3), and a mobile base (633) located at the driving screw (631) and connected to the mobile plate (42) for the driving screw (631) to drive the mobile plate (42).

Figure 8:
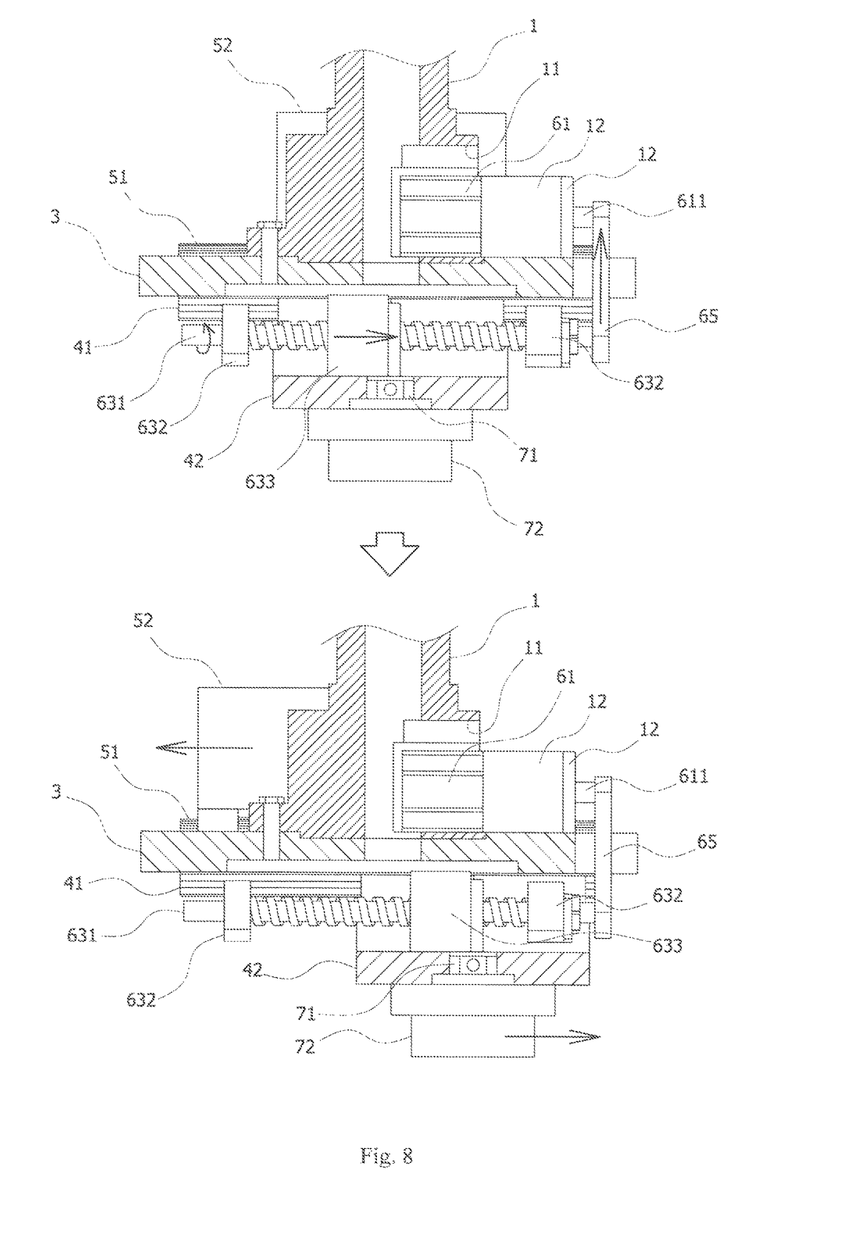
FIG. 8 is a cross-sectional view showing the headstock structure performing horizontal radial movement.

Please see FIGS. 3 and 6, the driving unit (6) comprises the servo motor (61), the first belt pulley (62), the driving screw set (63), the second belt pulley (64), and the belt (65). The servo motor (61) is electrically connected to the conducting slip ring (2). The conducting slip ring (2) supplies power to servo motor (61), so that the first belt pulley (62) mounted on shaft (611) rotates, and the belt (65) indirectly drives the second belt pulley (64) to rotate. As shown in FIG. 8, the second belt pulley (64) drives the driving screw (631) of the driving screw set (63), so as to drive the mobile base (633) to move radially, and to move the mobile plate (42) connected to mobile base (633). The travel direction of mobile plate (42) is tangent to the radius of rotating plate (3), so it is radial motion, it can shift when the rotating plate (3) is rotating or not, the overall operation is more flexible.

Please see FIG. 4, the spindle comprises a slot (11) disposed at one side of the lower end thereof for holding the servo motor (61); the slot (11) comprises at least one fixing component (12) disposed outside thereof for fixing the servo motor (6), and the fixing component (12) has a punch hole (121) corresponding to the shaft (611).

As the servo motor (61) shall drive the mobile plate (42) to perform radial motion, the servo motor (61) must be placed on the rotating plate (3). For stable running of rotating plate (3), the slot (11) is located in spindle (1) for holding one end of servo motor (61), so that the rotating plate (3) rotates evenly. The other end of the servo motor (61) is enclosed by the fixing component (12), so as to protect the overall servo motor (61). Furthermore, as shown in FIG. 3, the servo motor (61) deviates from the center of rotating plate (3) slightly, in order to keep the rotating plate (3) balanced during rotation, there is a gap (32) in one side of the rotating plate (3), the opposite side is free of gap. The gap (32) is located between the first belt pulley (62) and the second belt pulley (64), not only keeping the weights on the right and left sides of rotating plate (3) balanced, but also allowing said belt (65) to go through, so as to avoid overlength of shaft (611) and driving screw (631).

Figure 9:
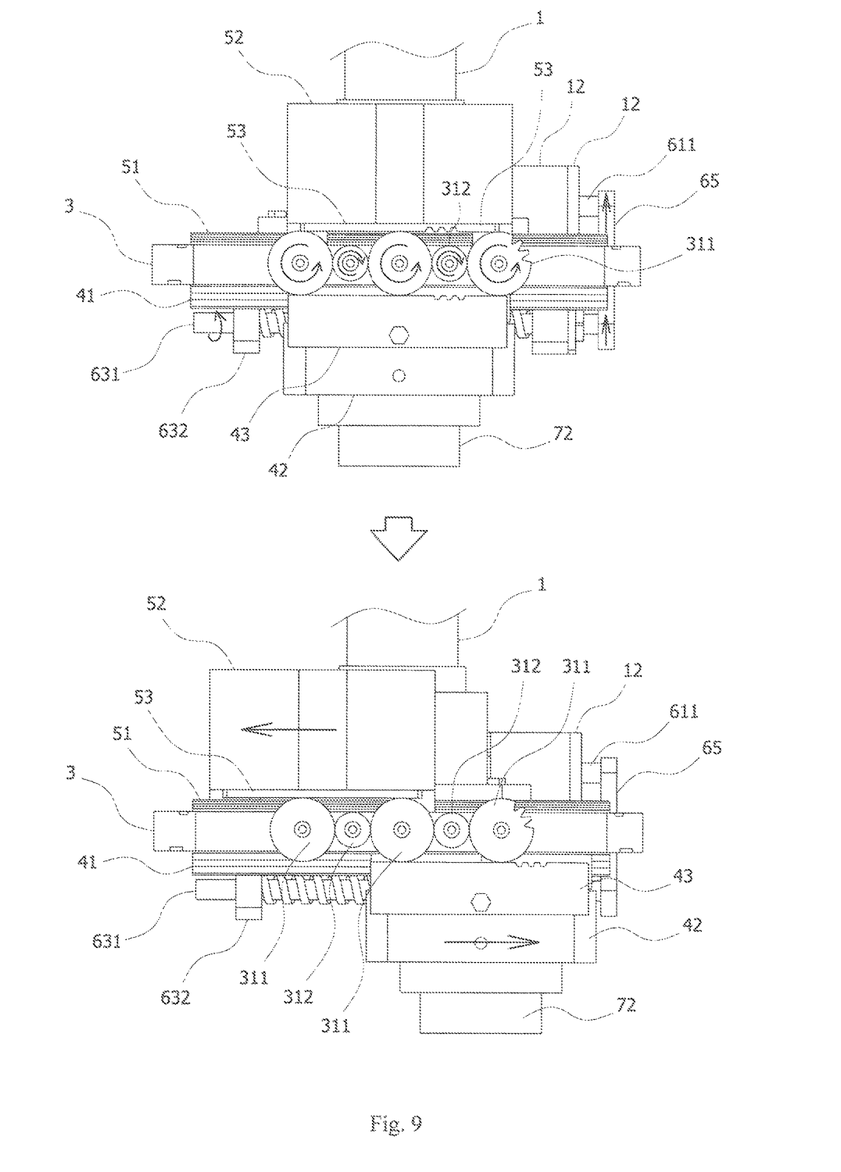
FIG. 9 is one side view showing the headstock structure performing horizontal radial movement.

As shown in FIGS. 8 and 9, the rotating plate (3) comprises a gear set (31) respectively disposed on two opposite sides thereof. The mobile unit (4) located on both sides of the mobile plate (42) respectively includes first tooth rows (43) corresponding to a side edge of the gear sets (31). The balancing unit (5) located under the two balancing weights (52) respectively includes second tooth rows (53) corresponding to the opposite side edge of the gear sets (31) for the two balancing weights (52) to move together with the mobile plate (42).

The gear set (31) comprises a plurality of follower gears (311) for connecting, the first tooth row (43) to the second tooth row (53) and a plurality of driven gears (312) disposed between the two follower gears (311).

In order to control the centrifugal force during rotation of mobile plate (42) and rotating plate (3), the gear set (31) is located on both sides of the rotating plate (3) respectively, the first tooth row (43) is located on both sides of the mobile plate (42), the second tooth row (53) is located under the two balancing weights (52) respectively, and the gear set (31) comprises big follower gears (311) and small driven gears (312) which are staggered and driven by each other. Therefore, only the follower gear (311) engages with the first tooth row (43) and the second tooth row (53), so that when the mobile unit (4) performs horizontal radial movement by means of driving unit (6), the first tooth row (43) can drive the follower gear (311) to rotate, and indirectly driving the second tooth row (53) for the balancing weight (52) to move oppositely on the balancing linear guideway (51). Therefore as shown in FIG. 9, when the mobile unit (4) moves towards the right side, the balancing unit (5) moves towards the left side. On the contrary, when the mobile unit (4) moves leftwards, the balancing unit (5) moves rightwards. Therefore, the operation of the overall equipment is balanced, the rotation is stable and safe.

Please see FIG. 6, the mobile unit (4) comprises an optical scale (44) disposed at one side of the mobile plate (42) and paralleled with the mobile linear guideway (41), and electrically connected to a master control circuit of machine tool. The optical scale (44) is configured to measure the traveling distance of the mobile plate (42) by photoresponse, and transmits the distance to the master control circuit of the CNC milling and boring machine tool for monitoring analysis and display, so that the CNC milling and boring machine tool can work more accurately.

As shown in FIG. 5, the cutter locking unit (7) comprises a cutter locking holder (71) and a cutter sleeve (72) for locking the cutter locking holder (71). The cutter locking holder (71) can be a wedge type cutter locking holder. The cutter locking holder (71) can drive the wedge to loosen and clamp cutter sleeve (72), so that the cutter can be changed. According to the cutter type, when the cutter locking unit (7) is located in the center of spindle (1), the overall headstock structure (100) can implement milling and drilling like the existing machine tool, and when the mobile unit (4) performs horizontal radial movement, plane turning can be implemented. In addition, the overall headstock structure (100) can implement boring during up and down movement, so as to operate different working procedures for the workpiece. Therefore, the present invention has simple overall structure, convenient installation and multiple functions, not only saving the expenses of purchasing other machinery equipment, but also reducing the production cost.

The above shows and describes the fundamental principles, major characteristics and advantages of the present invention. Those skilled in the art shall understand that the present invention is not limited by the foregoing, embodiments, and the foregoing embodiments and description only explain the principles of the present invention. The present invention may also have various modifications and improvements without departing from the spirit and scope of the present invention, these various modifications and improvements shall all fall within the protection scope of the present invention claimed which is defined by the appended claims and equivalents thereof.

We claim:

1. A headstock structure of computer numerical control milling and boring machine tool comprising:
    the headstock structure (100) comprising a spindle (1), a conducting slip ring (2), a rotating plate (3), a mobile unit (4), two balancing units (5), a driving unit (6), and a cutter locking unit (7);
    the conducting slip ring (2) being sleeved on a top end of the spindle (1);
    the rotating plate (3) being disposed below a lower end of the spindle (1) and rotated in horizontal direction under the drive of the spindle (1);
    the mobile unit (4) being disposed below the rotating plate and rotated in horizontal direction together with the rotating plate (3);
    the two balancing units (5) being located on the rotating plate (3), and on two opposite sides of the spindle (1) respectively;
    the driving unit (6) being located on one side of the rotating plate (3) and the mobile unit (4), and configured to drive the mobile unit (4) to perform horizontal radial movement;
    the cutter locking unit (7) being located under the mobile unit (4) and configured to lock the cutter;
    wherein the mobile unit (4) comprises two symmetrically spaced mobile linear guideways (41) connected to the rotating plate (3) and a mobile plate (42) located under the two mobile linear guideways (41) which can be shifted at the two mobile linear guideways (41).

2. The headstock structure of computer numerical control milling and boring machine tool according to claim 1, wherein the balancing unit (5) comprises a balancing linear guideway (51) corresponding to the mobile linear guideway (41) and a balancing weight (52) located on the balancing linear guideway (51) which can be shifted on the balancing linear guideway (51).

3. The headstock structure of computer numerical control milling and boring machine tool according to claim 1, wherein the driving unit (6) comprises a servo motor (61) with a shaft (611) located on the rotating plate (3) and electrically connected to the conducting slip ring (2); a first belt pulley (62) connected to the shaft (611) for the servo motor (61) to drive; a driving screw set (63) located under the rotating plate (3); a second belt pulley (64) connected to the driving screw set (63); and a belt (65) located between the first belt pulley (62) and the second belt pulley (64) for the first belt pulley (62) to drive the second belt pulley (64).

4. The headstock structure of computer numerical control milling and boring machine tool according to claim 3, wherein the driving screw set (63) comprises a driving screw (631); two fixed blocks (632) located on both ends of the driving screw (631) and connected to the rotating plate (3); and a mobile base (633) located at the driving screw (631) and connected to the mobile plate (42) for the driving screw (631) to drive the mobile plate (42).

5. The headstock structure of computer numerical control milling and boring machine tool according to claim 1, wherein the spindle comprises a slot (11) disposed at one side of the lower end thereof for holding the servo motor (61); the slot (11) comprises at least one fixing component (12) disposed outside thereof for fixing the servo motor (6), and the fixing component (12) has a punch hole (121) corresponding to the shaft (611); the rotating plate (3) comprises a gap (32) disposed at one side thereof for keeping the rotating plate (3) balanced during rotation, the gap (32) being located between the first belt pulley (62) and the second belt pulley (64) for the belt (65) to go through.

6. The headstock structure of computer numerical control milling and boring machine tool according to claim 1, wherein the rotating plate (3) comprises a gear set (31) respectively disposed on two opposite sides thereof; the mobile unit (4) located on both sides of the mobile plate (42) respectively includes first tooth rows (43) corresponding to a side edge of the gear sets (31); the balancing unit (5) located under the two balancing weights (52) respectively includes second tooth rows (53) corresponding to the opposite side edge of the gear sets (31) for the two balancing weights (52) to move together with the mobile plate (42).

7. The headstock structure of computer numerical control milling and boring machine tool according to claim 6, wherein the gear set (31) comprises a plurality of follower gears (311) for connecting the first tooth row (43) to the second tooth row (53) and a plurality of driven gears (312) disposed between the two follower gears (311).

8. The headstock structure of computer numerical control milling and boring machine tool according to claim 1 wherein the mobile unit (4) comprises an optical scale (44) disposed at one side of the mobile plate (42) and paralleled with the mobile linear guideway (41), and electrically connected to a master control circuit of machine tool.

\* \* \* \* \*